(12) United States Patent
Alt et al.

(10) Patent No.: US 8,580,703 B2
(45) Date of Patent: Nov. 12, 2013

(54) ADDITIVE COMPONENT FOR THE IMPROVEMENT OF THE PERFORMANCE OF OLEFIN POLYMERISATION CATALYSTS

(76) Inventors: Helmut Alt, Bayreuth (DE); Tim Bast, Walchwil (CH)

( * ) Notice: Subject to any disclaimer, the term of this patent is extended or adjusted under 35 U.S.C. 154(b) by 2139 days.

(21) Appl. No.: 10/505,654

(22) PCT Filed: Feb. 20, 2003

(86) PCT No.: PCT/EP03/01705
§ 371 (c)(1),
(2), (4) Date: Dec. 23, 2005

(87) PCT Pub. No.: WO03/070787
PCT Pub. Date: Aug. 23, 2003

(65) Prior Publication Data
US 2007/0254803 A1    Nov. 1, 2007

(30) Foreign Application Priority Data

Feb. 22, 2002 (EP) .................................. 02090071

(51) Int. Cl.
*B01J 21/18* (2006.01)
*B01J 27/20* (2006.01)
*B01J 31/00* (2006.01)
*B01J 37/00* (2006.01)
*C08F 4/02* (2006.01)
*C08F 4/60* (2006.01)

(52) U.S. Cl.
USPC ............ 502/174; 502/102; 502/150; 502/152

(58) Field of Classification Search
None
See application file for complete search history.

(56) References Cited

U.S. PATENT DOCUMENTS

| 3,256,236 | A | * | 6/1966 | Herman et al. | ............... | 523/205 |
| 3,317,628 | A | * | 5/1967 | Schuck et al. | ............... | 585/510 |
| 5,064,801 | A | * | 11/1991 | Juntgen et al. | ............... | 502/180 |
| 6,576,726 | B1 | * | 6/2003 | Rieger | ............... | 526/160 |
| 6,734,267 | B2 | * | 5/2004 | Chang | ............... | 526/160 |
| 2001/0031698 | A1 | * | 10/2001 | Loveday et al. | ............... | 502/155 |

FOREIGN PATENT DOCUMENTS

WO    WO-99/52950    * 10/1999

* cited by examiner

*Primary Examiner* — Emily Le
*Assistant Examiner* — Michael Forrest

(57) ABSTRACT

The present invention relates to a catalyst composition for polymerising olefin monomers to polyolefins comprising a catalyst component and a first additive component. The first additive component is a fossil and may for example be obtained from coal.

12 Claims, No Drawings

US 8,580,703 B2

ADDITIVE COMPONENT FOR THE IMPROVEMENT OF THE PERFORMANCE OF OLEFIN POLYMERISATION CATALYSTS

FIELD OF THE INVENTION

The present invention relates to a catalyst composition for polymerising olefin monomers to polyolefins comprising a polyolefin polymerisation catalyst component and a first additive component.

BACKGROUND

Polyolefins, including for example polyethylene and polypropylene, are a well known polymer material for a wide variety of applications. There is also known in the art a wide variety of different catalysts for the polymerisation of olefin monomers. Such catalysts can be metallocene complexes, half-sandwich complexes or any other type of coordination compounds containing a transition metal and at least one multidentate ligand.

Such polyolefin polymerisation catalysts in most instances are used with at least one activator component such as methylalumoxane. The activator components are generally thought to alkylate the catalyst precursor and then to abstract a methyl group from the transition metal thus generating the actual catalyst.

In order to further improve the polymerisation process and also the polymer properties, there have been various attempts in the art to support the catalysts on a support medium. Known support media include carbon black, polymers such as 1,2-polybutadiene, inorganic oxides such as silica (optionally treated with butyl ethyl magnesium or with methylalumoxane (MAO)), Mg(OH)Cl, alumina ($Al_xO_y$), salts such as $MgCl_2$, as well as other materials such as various silicates, clays, montmorrilonite, vermiculite, hectorit, mica, smectite, polymers, cyclodextrins, and the like. A detailed review of known support media can be found for example in a review article by Hlatky (Chem. Rev. 2000, 100, 1347-1376).

It is an object of the present invention to provide a universal additive component for use in catalyst compositions for the polymerisation of olefin monomers which overcomes the disadvantages posed by prior art catalyst compositions and the resulting polymers.

It is an object of the present invention to provide a first additive component for use in catalyst compositions for the polymerisation of olefin monomers capable of the improving performance of the catalyst component for example in terms of increasing the activity of the catalyst.

It is an further object of the present invention to provide a first additive component for use in catalyst compositions for the polymerisation of olefin monomers capable of improving the quality of the produced polyolefin polymer for example in terms of the molecular weight.

It is a further object of the present invention to provide a first additive component for used in catalyst compositions capable of increasing the catalyst composition lifetime during polymerisation.

It is a further object of the present invention to provide a first additive component capable of interacting with other components of the catalyst composition in a synergistic manner.

It is a further object of the present invention to provide a process of polymerising olefin monomers using the first additive component of the present invention.

It is a further object of the present invention to provide a process for making the first additive component of the present invention.

It is a further object of the present invention to provide a process for pre-treating the first additive component of the present invention.

SUMMARY OF THE INVENTION

The present invention provides a catalyst composition for polymerising olefin monomers comprising a polyolefin catalyst, the catalyst composition comprises a first additive component characterised in that the first additive component is a fossil.

The present invention further provides a catalyst composition for polymerising olefin monomers wherein the first activator component further comprises at least 50 weight-% of carbon atoms.

The present invention further provides a catalyst composition for polymerising olefin monomers wherein the first additive component is obtainable from coal.

The present invention further provides a catalyst composition for polymerising olefin monomers wherein the first additive component is obtainable from brown coal by a process comprising the steps of
  grinding and sieving the brown coal to a particle size of less than 0.1 mm
  optionally demineralising the particles
  optionally oxidising the particles with an air ammonia mixture
  carbonising the particles The present invention further provides a catalyst composition for polymerising olefin monomers wherein the catalyst composition further comprises a first activator component.

The present invention further provides a catalyst composition for polymerising olefin monomers wherein the first activator component comprises boron atoms.

The present invention further provides a process for polymerising olefin monomers comprising the steps of
  providing a polyolefin catalyst
  providing a first additive component, the first additive component comprising a fossil
  providing one or more types of different olefin monomers
  polymerising the one or more monomers The present invention further provides a process for polymerising olefin monomers wherein said step of providing a first additive component comprises the steps of
  grinding and sieving the brown coal to a particle size of less than 0.1 mm
  optionally demineralising the particles
  optionally oxidising the particles with an air ammonia mixture
  carbonising the particles The present invention further provides a process for polymerising olefin monomers wherein the process further comprises the step of providing a first activator component.

The present invention further provides a process for polymerising olefin monomers wherein the first activator component comprises boron atoms.

DETAILED DESCRIPTION OF THE INVENTION

The present invention relates to a catalyst composition for polymerising olefin monomers to polyolefins.

As used herein, the term "olefin monomer" refers to unsaturated hydrocarbon compounds comprising at least one carbon-carbon double bond. Olefin monomers are known to be available to be polymerised by many techniques known in the art. Olefin monomers generally maybe aliphatic or aromatic. Olefin monomers suitable for the present invention include but are not limited to alkenes (such as ethene, propene, butene, and the like), alkadienes (such as octadiene and the like), cyclic compounds (such as norbornadiene and the like), and the like.

As used herein, the term "polyolefin" refers to a polymer molecule consisting of a plurality of one, two, or more different olefin monomers.

As used herein, the term "polymerising olefin monomers" refers to the process of synthesizing a polyolefin from a mixture of one, two, or more different olefin monomers.

As used herein, the term "polyolefin catalyst" refers to species capable of catalysing the polymerisation of olefin monomers.

A wide range of polyolefin catalysts is suitable for the present invention including, but not limited to metallocene catalysts or half-sandwich complexes, transition metal compounds, including the transition metal coordination catalysts often referred to as Ziegler/Natta catalysts, and the like. Catalysts that benefit from the use of organoaluminum compounds may also be used. Some typical examples of the transition metal coordination catalysts include titanium tetrachloride, titanium tetraethoxide, vanadium dichloride, vanadium trichloride, vanadium tetrachloride, titanium trichloride, zirconium tetrachloride, niobium pentachloride, tantalum pentachloride, chromic trichloride, vanadyl acetylacetonate, chromium acetylacetonate, and the like. Other examples of olefin polymerization catalysts include transition metal complexes of bidentate and multidentate ligands such as those disclosed in WO 96/23010 any may also include nickel, iron and palladium complexes as well as other complexes with various transition metals and lanthanides.

A catalyst composition suitable for the present invention comprises one or more metallocene catalyst components.

A wide variety of metallocene catalyst components is known in the art for being useful in polymerising polyolefins. A metallocene catalyst component that is useful for the polymerisation of at least one olefin monomer is generally suitable for the present invention. The metallocene catalyst component may be a bridged or an unbridged metallocene compound.

As used herein, the term "metallocene compound" includes a metal atom sandwiched between two substituted or unsubstituted molecules selected from the group of cyclopentadienyl, indenyl, fluorenyl, and other suitable ligands such as heterocycles. More generally, the term metallocene catalyst as used herein includes but is not limited to organometallic compounds of the formula:

wherein each L is a bulky organo ligand, each A is a replaceable group, M is a transition metal selected from Groups 3-6 and 8-10 of the Periodic Table including the lanthanide and actinide metals, and m and n are integers such that the total ligand valence corresponds to the valence of M. The ligands L and A may be bridged to each other, and if two L and/or A ligands are present they may also be bridged. The metallocene compound may be full-sandwich bonded having two or more ligands each having a cyclopentadienyl structure or half-sandwich compounds having only one ligand having a cyclopentadienyl structure. Ligands having a cyclopentadienyl structure include ligands having an indenyl or a fluorenyl structure or any other ligand of aromatic nature including heterocyclic compounds. Preferably at least one ligand L has a multiplicity of bonded atoms, preferably carbon atoms, and a cyclic structure such as a cyclopentadienyl ligand or any other ligand capable of eta-5 or eta-3 bonding to M. Examples of typical removable groups A include halides such as chloride, hydrocarbyls such as phenyl or alkyl, or other univalent anionic ligands whereby halides are preferred and chlorine is particularly preferred. The term metallocene as used herein thus includes the catalysts of the type disclosed in U.S. Pat. No. 5,055,438, the disclosure of which is incorporated by reference. A wide variety of suitable metallocene catalysts is known in the art.

As used herein, the term "bridged metallocene compound" refers to a metallocene compound in which the two sandwich ligands are substituted with one or more bridging groups. Such a bridging group effectively hinders the sandwich ligands to rotate relative to each other. Conversely, in unbridged metallocene compounds the sandwich ligands are generally considered to be rotatable relative to each other.

The catalyst composition of the present invention further comprises a first additive component. Optionally, the catalyst composition of the present invention may comprise further additive components different from the first additive component but selected from the same overall group of additive components as described below.

As used herein, the term "additive component" refers to a component of a catalyst composition for polymerising olefin monomers that is capable of improving the performance of the catalyst component for example in terms of increasing the activity or the stability of the catalyst composition for the synthesis of at least one polyolefin and/or the properties of the obtained polyolefin polymer.

The first additive component of the present invention is a fossil.

The term "fossil" as used herein refers to the residues of the whole or a part of dead plants or dead animals that have been preserved or are in the process of being preserved. The age of a fossil according to the present invention may be as small as half a year. Other fossils within the scope of the present invention are preferably at least 1000 years old, more preferably at least 10000 years, yet more preferably at least 100000 years old. Preservation generally refers to increasing the portion of carbon in the plant or animal mass. Without wishing to be bound by this theory, it is generally believed that preservation may be caused by mineralisation or degradation by microorganisms or other animals. Generally, fossils may be found in a stratum of sedimentary rock or in certain layers of soils. The term fossil particularly includes fossil fuels such as coal and in particular mineral coal and brown coal. Also included are humus soil and peat.

The first additive component of the invention is a fossil which is solid at room temperature.

The first additive component of the present invention preferably comprises at least 2 weight-% of nitrogen atoms, more preferably at least 5 weight-%, yet more preferably at least 10 weight-%, most preferably at least 15 weight-% of nitrogen atoms.

The first additive component of the invention comprises between 50 weight-% and 80 weight-% of carbon atoms.

Without wishing to be bound by this theory, the first additive component of the present invention is believed to be useful in providing a advantageous support medium for the metallocene catalyst of the present invention.

Preferably, the first additive component of the present invention has a particle size of less than 0.1 mm, more preferably less than 0.05 mm, yet more preferably less than 0.001 mm, and most preferably less than 0.006 mm. The particle size may be optimised individually for use with a specific catalyst composition of the present invention.

A suitable first additive component is obtainable from coal, preferably brown coal, more preferably brown coal of the lignite type. A suitable method for obtaining a suitable first activator component is described below.

The catalyst composition of the present invention optionally comprises a first activator component and optionally further activator components. Without wishing to be bound by this theory, the first activator component is believed to be useful in ionising the metallocene catalyst of the catalyst composition of the present invention. A number of useful first activator components is well known in the art including but not being limited to alkyl aluminums such as trialkyl aluminums, methyl aluminates (MAO), alkyl aluminates, various boron containing compounds such as those disclosed in EP-A-277 003, EP-A-0 277 004 and in WO-A-99/52950), and the like.

The catalyst composition of the present invention optionally comprises a first support component. Without wishing to be bound by this theory, it is believed that at a portion of the catalyst complex and/or the first activator component are adsorbed to the surfaces of the first support component. Suitable first support components include but are not limited to carbon black, polymers such as 1,2-polybutadiene, inorganic oxides such as silica (optionally treated with butyl ethyl magnesium or with methylalumoxane (MAO)), Mg(OH)Cl, alumina ($Al_xO_y$), salts such as $MgCl_2$, as well as other materials such as various silicates, clays, montmorrilonite, vermiculite, hectorit, mica, smectite, polymers, cyclodextrins, and the like.

It is a further aspect to provide a process for polymerising olefin monomers.

The polymerisation process of the present invention comprises the steps of
- providing a catalyst component for the polymerisation of polyolefins
- providing a first additive component, said first additive component comprising a fossil
- providing one or more types of olefin monomers
- polymerising said one or more monomers The specific process parameters to be used with a specific polyolefin catalyst component or a specific polyolefin catalyst component mixture are known in the art from the respective disclosure of the catalyst or the catalysts. Optimisation of these parameters for use with the process of the present invention is considered within the scope of the routine work of the skilled artisan. The suitable types of olefin polymers for use with a specific metallocene catalyst component or metallocene catalyst component mixture are further known in the art.

The first additive component of the present invention may be added at any stage of the preparation of the polymerisation composition before the start of the polymerisation process. Hence, the order of the first three steps of the above method for polymerising a polyolefin may be altered without loosing the benefits of the present invention.

The amount of first additive component in the catalyst composition of the present invention needs to be determined individually depending on the benefit to be achieved. It has been generally observed by the inventors that the activity of the catalyst reaches a maximum for a certain amount of first additive component relative to the amount of the other constituents of the catalyst composition. For higher amounts of the first additive, the activity of the catalyst component has been seen to be lower. Determining the optimum amount of first additive component in view of the benefit to be achieved (such as high activity) and individually for each catalyst composition and for each kind of first additive component is considered within the routine skill of the practitioner of the art.

It is further to be determined by the skilled practitioner if the pre-treatment of the fossil as described below leads to an improvement of the catalyst composition.

Preferably, the polymerisation process of the present invention further comprises a step of providing a first activator component as defined above. The optimum ratio of catalyst to first activator component is different for each catalyst complex and accordingly needs to be determined individually for each catalyst composition of the present invention. Such a determination is deemed to be within the routine skill of the practitioner of the art. In analogy, other process parameter such as the ratio of aluminium atoms to water molecules should also be optimised individually.

Optionally, the process for polymerising olefin monomers according to the present invention may additionally comprise a step of providing a first support medium as defined above.

It is well known in the art that adding hydrogen to the polyolefin polymerisation vessel will increase the catalyst activity whilst reducing the molecular weight of the catalyst. In particular where the catalyst composition of the present invention leads to increased molecular weights, the addition of hydrogen to the process of the present invention may lead to even further increased activities.

There are known in the art a wide variety of different polyolefin polymerisation processes including but not being limited to gas phase, solution in a solvent, solution in monomer, slurry, variations of those, and the like. Suitable polymerisation processes include homogenous as well as heterogeneous polymerisation processes. All these processes are compatible for being used in the process of polymerising a polyolefin in accordance with the present invention.

It is a further aspect of the present invention to provide a method for providing a first additive component suitable for the catalyst composition of the present invention and the polymerisation process of the present invention. This method of pre-treating the first additive component is not essential for the present invention but it may improve the polymerisation process and/or the polyolefin polymer. The method of providing a first additive component of the present invention preferably comprises the following steps
- grinding and sieving the brown coal to a particle size of less than 0.1 mm
- optionally demineralising of the particles
- optionally oxidising the particles with an air ammonia mixture
- carbonising the particles The step of grinding and sieving is intended to increase the total surface area of the particles. Preferably, the particle are ground and sieved to a particle size of less than 0.1 mm, more preferably to less than 0.05 mm, yet more preferably to less than 0.001 mm, and most preferably to less than 0.006 mm. Suitable grinding mills and sieves for carrying out this step are well known in the art.

The optional step of demineralising the particles is intended to remove impurities from the particles. Such impurities could hamper the polymerisation process. A suitable, exemplary process for demineralisation is described in Brannstoff Chem., 37, 353 (1956).

The optional step of oxidising the particles with an air ammonia mixture is intended to introduce additional nitrogen atoms into the particles and in particular to the particle surfaces.

The air ammonia ratio preferably is less than 10:1, more preferably less than 8:1, yet more preferably less than 5:1, most preferably less than 3:1.

The air ammonia ratio preferably is at least 1:10, more preferably at least 1:8, most preferably at least 1:5.

The oxidation time is preferably at least 1 hour, more preferably at least 3 hours, most preferably at least 5 hours.

The oxidation temperature preferably is at least 200° C. more preferably at least 225° C., most preferably 250° C. The oxidation temperature is preferably less than 300° C., more preferably less than 275° C.

The step of carbonisation of the particles is well known in the art for removing volatile compounds from the particles. The carbonisation is preferably carried out under a noble gas atmosphere (preferably argon) and preferably at a temperature of at least 600° C.

For other fossils, other methods of removing water from the fossil may be preferred and may be chosen by the skilled artisan. The removal of water or the reduction of the water content may be essential for some fossils where the water content is so high as to interfere with the catalyst, the first activator component or the polymerisation process as such.

EXAMPLES

First Additive Component A (Dried Coal)

The first additive component A of the example was obtained from brown coal of the lignite type which was taken from the strip mine "Konin II" near Konin, Poland. The raw material was ground in a porcelain ball mill and subsequently sieved to obtain only particles with a size of less than 0.006 mm.

The sieved particles are carbonised at low temperature. The particles are heated up to 700° C. for one hour under an argon atmosphere.

First Additive Component B (Pre-Treated Coal)

The first additive component B was obtained from brown coal of the lignite type which was taken from the strip mine "Konin II" near Konin, Poland. The raw material was ground in a porcelain ball mill and subsequently sieved to obtain only particles with a size of less than 0.006 mm.

Then, the brown particles were demineralised by treating the particles with concentrated HCl and 40% HF in accordance with the method described in Brannstoff Chem., 37, 353 (1956).

Subsequently, the demineralised particles are oxidized with an air-ammonia mixture. Example A was treated with a 3:1 air ammonia mixture and Example B was treated with a 2:3 air ammonia mixture for five hours each.

Finally, the particles are carbonised at low temperature. The particles are heated up to 700° C. for one hour under an argon atmosphere.

Polyolefin Polymerisation Catalyst Component

The first additive component of the present invention has been used in various polyolefin catalyst compositions such as in combination with known metallocene complexes (bridged and unbridged) and with known Ni-, Fe-, and V-complexes.

Polymerisation

The first additive components A and B of the present invention has been added to the catalyst composition at various stages of the preparation of the polymerization. In particular, the coal has been added to the solvent before and after adding the catalyst complex.

Typically, between 0.1 to 1 g of the first additive component have been added to a catalyst composition corresponding to 1 to 20 mg of catalyst complex. Polymerisation have been carried out with various olefin monomers and in particular with ethene and propene.

Results

It has been observed that the catalyst composition of the present invention exhibits an improved polymerisation performance. Performance improvements have been observed for example in terms of activity, in terms of catalyst lifetime, and in terms of increased molecular mass of the obtained polyolefin.

The invention claimed is:

1. A catalyst composition for polymerizing olefin monomers comprising:
   a polyolefin catalyst having a metallocene catalyst, a first activator component and a first additive component; where the first additive component is a fossil that is solid at room temperature and comprises the residues of dead plants and animals; and where the first additive component comprises between at least 50 and 80% by weight of carbon atoms.

2. The catalyst composition for polymerizing olefin monomers according to claim 1 where the first additive component comprises coal.

3. The catalyst composition for polymerizing olefin monomers according to claim 1 where the first activator component comprises boron atoms.

4. A process for polymerizing olefin monomers comprising the steps of:
   providing a catalyst composition for polymerizing olefin monomers comprising: a polyolefin catalyst having a metallocene catalyst, a first activator component and a first additive component; where the first additive component is a fossil that is solid at room temperature and comprises the residues of dead plants and animals; and where the first additive component comprises between at least 50 and 80% by weight of carbon atoms
   providing at least one olefin monomers; and
   polymerizing the olefin monomers using the catalyst composition.

5. The process for polymerizing olefin monomers according to claim 4 where the step of providing a first additive component comprises the step of: grinding and sieving the first additive component to a particle size of less than 0.1 mm.

6. A process for polymerizing olefin monomers according to claim 4 where the first activator component comprises boron atoms.

7. A catalyst composition for polymerizing olefin monomers comprising:
   a polyolefin catalyst having a half-sandwich complex, a first activator component and a first additive component; where the first additive component is a fossil that is solid at room temperature and comprises the residues of dead plants and animals; and the first additive component comprises between at least 50 and 80% by weight of carbon atoms.

8. The catalyst composition for polymerizing olefin monomers according to claim 7 where the first additive component comprises coal.

9. The catalyst composition for polymerizing olefin monomers according to claim 7 where the first activator component comprises boron atoms.

10. The process for polymerizing olefin monomers according to claim 5 where the step of providing a first additive component comprises the step of optionally demineralizing the particles.

11. The process for polymerizing olefin monomers according to claim 5 where the step of providing a first additive component comprises the step of oxidizing the particles with an air ammonia mixture.

12. The process for polymerizing olefin monomers according to claim 5 where the step of providing a first additive component comprises the step of carbonizing the particles.

* * * * *